US012696035B2

(12) United States Patent
Boehlke

(10) Patent No.: US 12,696,035 B2
(45) Date of Patent: Jul. 28, 2026

(54) SYSTEM AND METHOD TO CONCEAL DISCONTINUITIES IN AUDIO BLOCKS

(71) Applicant: Datavault AI Inc., Beaverton, OR (US)

(72) Inventor: Kenneth A. Boehlke, Portland, OR (US)

(73) Assignee: Datavault AI Inc., Philadelphia, PA (US)

( * ) Notice: Subject to any disclaimer, the term of this patent is extended or adjusted under 35 U.S.C. 154(b) by 0 days.

(21) Appl. No.: 19/315,482

(22) Filed: Aug. 30, 2025

(65) Prior Publication Data

US 2025/0386140 A1 Dec. 18, 2025

Related U.S. Application Data

(63) Continuation of application No. 18/196,319, filed on May 11, 2023, now Pat. No. 12,407,983.

(60) Provisional application No. 63/340,903, filed on May 11, 2022.

(51) Int. Cl.
*H04R 3/12* (2006.01)
*H04R 3/04* (2006.01)

(52) U.S. Cl.
CPC ................ *H04R 3/12* (2013.01); *H04R 3/04* (2013.01); *H04R 2420/07* (2013.01); *H04R 2430/01* (2013.01)

(58) Field of Classification Search
CPC ........ H04R 3/12; H04R 3/04; H04R 2420/07; H04R 2430/01
See application file for complete search history.

(56) References Cited

U.S. PATENT DOCUMENTS

| | | | | |
|---|---|---|---|---|
| 5,396,497 | A | 3/1995 | Veltman | |
| 10,819,374 | B2 | 10/2020 | Ruano | |
| 11,025,600 | B1 | 6/2021 | Medard | |
| 2003/0194004 | A1 * | 10/2003 | Srinivasan | H04H 60/39 375/240 |
| 2003/0234889 | A1 | 12/2003 | Kim | |
| 2004/0131332 | A1 | 7/2004 | Wilson | |
| 2007/0172208 | A1 | 7/2007 | Okada | |

(Continued)

FOREIGN PATENT DOCUMENTS

CN 102306495 A * 1/2012 ............ H04R 3/007

OTHER PUBLICATIONS

"IEEE Standard for a Precision Clock Synchronization Protocol for Networked Measurement and Control Systems," Jun. 16, 2020 (499 Pages).

*Primary Examiner* — Carolyn R Edwards
*Assistant Examiner* — Dylan Maguire Neece
(74) *Attorney, Agent, or Firm* — Greenberg Traurig, LLP; Chinh H. Pham; Kristopher Reichlen

(57) ABSTRACT

The present disclosure provides systems, methods, and audio devices for concealing discontinuities in wireless audio playback. In one embodiment, an audio device includes a wireless receiver and a replay buffer. The replay buffer stores audio blocks and detects a discontinuity in the sequence. A replacement audio block is generated by flipping time indices of a stored audio block and conditionally applying a vertical flip based on slope continuity. The replacement block is filtered using a glitch filter with coefficients selected according to frequency content of the stored block, and crossfaded with the stored block to produce output audio that conceals the discontinuity.

20 Claims, 10 Drawing Sheets

(56) References Cited

U.S. PATENT DOCUMENTS

| | | | | |
|---|---|---|---|---|
| 2008/0312932 | A1* | 12/2008 | Smith | G10L 19/005 704/E19.003 |
| 2020/0028624 | A1 | 1/2020 | Fouli | |

* cited by examiner

SYSTEM AND METHOD TO CONCEAL DISCONTINUITIES IN AUDIO BLOCKS

CROSS REFERENCE TO RELATED APPLICATIONS

This application is a continuation of U.S. Non-Provisional application Ser. No. 18/196,319 filed on 11 May 2023 and entitled "SYSTEMS AND METHODS TO CONCEAL UN-RECOVERABLE AUDIO BLOCKS" which claims priority to U.S. Provisional Application No. 63/340,903 filed on 11 May 2022 and entitled "SYSTEMS AND METHODS FOR AUDIO TIMING AND SYNCHRONIZATION," and are herein incorporated by reference in their entirety.

FIELD OF THE DISCLOSURE

The present disclosure is related generally to the wireless distribution of high-quality audio signals and, in particular to a system and methods of distributing high-bitrate, multichannel, audio wirelessly while maintaining low latency.

BACKGROUND

Key to a good wireless audio customer experience is a robust low latency wireless link. Low Latency audio is desirable for enabling good audio to video synchronization (or Lip Sync) because this is compatible with a broad range of televisions.

If the wireless link has high latency then it will not work with low latency televisions because the audio cannot be advanced to match the video. On the other hand, a low latency wireless link will work with both low and high latency TVs as the transmitted audio can always be delayed to match the video.

SUMMARY

The present disclosure provides for novel systems and methods of audio transmission that alleviate shortcomings in the art, and provide novel mechanisms for resolving discontinuities in audio data. There are times in which the wireless medium is busy and the transmitter does not have an opportunity to transmit audio. If the busy duration of the medium exceeds the latency requirements of the system, then this audio will be delayed past the point in time when it is scheduled to be played. This delayed audio may be dropped at the transmitter, if possible, or it may be dropped when received at the receiver. In either case, there may be a block or blocks of audio data that may advantageously be concealed at the receiver.

The present disclosure provides systems, methods, and audio devices for concealing discontinuities in wireless audio playback. In one embodiment, an audio device includes a wireless receiver and a replay buffer. The replay buffer stores audio blocks and detects a discontinuity in the sequence. A replacement audio block is generated by flipping time indices of a stored audio block and conditionally applying a vertical flip based on slope continuity. The replacement block is filtered using a glitch filter with coefficients selected according to frequency content of the stored block, and crossfaded with the stored block to produce output audio that conceals the discontinuity.

In various embodiments, an audio device includes a wireless receiver configured to obtain a sequence of audio blocks from a source device, a replay buffer configured to store the sequence of audio blocks and detect discontinuities in the sequence. When a discontinuity is detected, the audio device may retrieve a stored audio block preceding the discontinuity, and generate a replacement audio block by performing at least one of: (i) flipping the time indices of the stored audio block, or (ii) vertically flipping the replacement audio block based on slope continuity. The replacement audio block may be further processed with an adaptive glitch filter having frequency coefficients based on the frequency content of the stored block. The processed replacement audio block is crossfaded with the stored audio block to generate smooth output audio that conceals the discontinuity.

Further embodiments provide for adaptive filtering and crossfade-to-zero functionality when a maximum number of replacement audio blocks is output without receipt of normal audio, synchronization of playback timing across multiple audio devices based on a master clock, and integration of the discontinuity concealment functions into televisions, soundbars, gaming consoles, wireless speakers, earbuds, or other consumer audio systems. Additional embodiments are directed to methods and devices with a processor that execute instructions from memory to implement these processes, thereby ensuring robust, synchronized, and uninterrupted wireless audio playback in practical environments.

Embodiments further provide for adaptive filtering and crossfade-to-zero functionality when a maximum number of replacement audio blocks is output without receipt of normal audio, synchronization of playback timing across multiple audio devices based on a master clock, and integration of the discontinuity concealment functions into televisions, soundbars, gaming consoles, wireless speakers, earbuds, or other consumer audio systems. Additional embodiments are directed to methods and non-transitory computer-readable media storing instructions to implement these processes, thereby ensuring robust, synchronized, and uninterrupted wireless audio playback in practical environments.

Other embodiments of systems and methods include steps for concealing un-recoverable audio block(s) including: receiving, by a receiving device, audio data includes a sequence of audio data blocks, where the sequence of audio data blocks includes at least one discontinuity; buffering in a repeat buffer, by the receiving device, each audio data block in order according to the sequence of audio data blocks; for the at least one discontinuity in the sequence of audio data blocks: accessing in the repeat buffer, by the receiving device, a previous audio data block preceding the at least one discontinuity; generating, by the receiving device, a horizontally flipped previous audio data block by flipping the time indices of the previous audio data block; determining, by the receiving device, a slope of the audio data in the horizontally flipped previous audio data block; generating, by the receiving device, a vertically and horizontally flipped audio data block by flipping the slope of the audio data of the horizontally flipped previous audio data black; filtering, by the receiving device, the vertically and horizontally flipped audio data block using a glitch filter; and crossfading, by the receiving device, the previous audio data block into the vertically and horizontally flipped audio data block to produce output audio data that conceals the at least one discontinuity.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
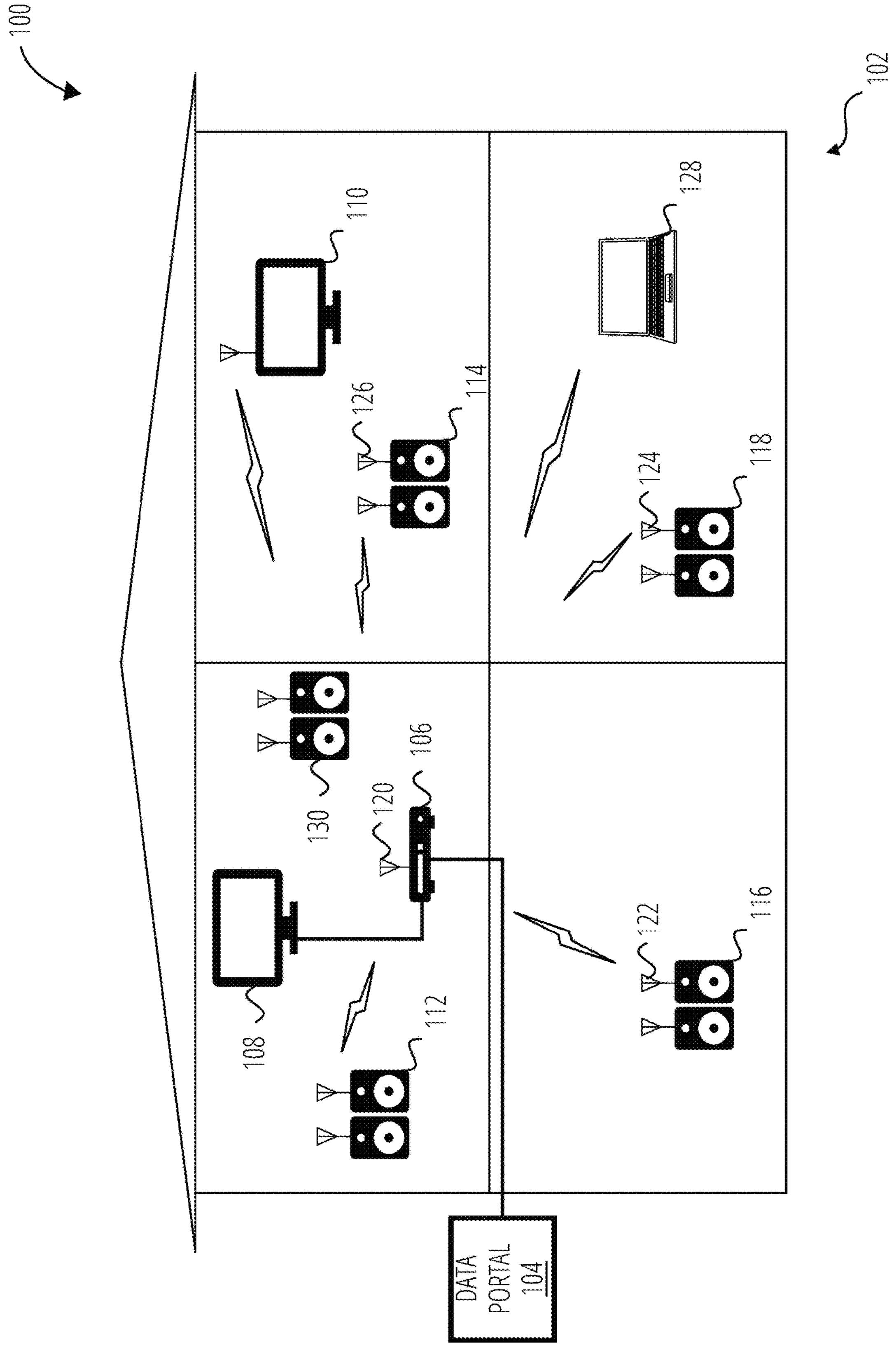
FIG. 1 is a block diagram illustrating non-limiting components of a general environment according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

FIGS. 1 through 10 illustrate systems and methods of audio signal discontinuity resolution. The following embodiments provide technical solutions and technical improvements that overcome technical problems, drawbacks and/or deficiencies in the technical fields involving delayed and/or dropped audio data. As explained in more detail, below, technical solutions and technical improvements herein include aspects of improved audio data processing to resolve dropped blocks of audio and conceal missing audio data using a specifically configured replay buffer. Based on such technical features, further technical benefits become available to users and operators of these systems and methods. Moreover, various practical applications of the disclosed technology are also described, which provide further practical benefits to users and operators that are also new and useful improvements in the art.

Certain embodiments will now be described in greater detail with reference to the figures.

Referring now to FIG. 1, FIG. 1 illustrates an environment 100 according to some embodiments of the present disclosure. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102 data, including video and audio data, may be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio may be distributed from a source 106 (e.g., DVD player, gaming console, computer, mobile device, and the like) for presentation by displays 108 and 110 and/or speakers 112, 114, 116, 118 through 130, e.g., for surround sound or stereo speaker units in different rooms of residence 102. In some embodiments, at least part of the distribution network may comprise one or more radio transmitters 120 which may be part of a source 106 and one or more radio receivers 122, 124 through 126 which may be incorporated in the networked devices such as a computer 128, a video display 110, or the speakers 112, 114, 116, 118 through 130 of one or more a stereo or surround sound systems.

As will be noted, in some embodiments, synchronization of the various outputs and minimization of system latency may be essential to high quality audio/video systems. As will be further noted, source-to-output delay or latency ("lip-sync") is important in audio/video systems, such as home theater systems, where a slight difference (e.g, on the order of 50 milliseconds (ms)) between display of a video sequence and the output of the corresponding audio is noticeable. On the other hand, the human car is even more sensitive to phase delay or channel-to-channel latency between the corresponding outputs of the different channels of multi-channel audio. In some embodiments, channel-to channel latency greater than a phase delay threshold associated with a delay which may result in the perception of disjointed or blurry audio, such as, e.g., 0.5, 1.0, 1.5, 2.0 microsecond (μs), or other delay.

According to some embodiments, in an AVB network, each network endpoint (e.g., a network node capable of transmitting and/or receiving a data stream) may include two clocks—a "wall" clock and a "media" or "sample" clock. In some embodiments, timing datums for the "sample" clock are sent in each audio packet calling out when the audio block is to be played with respect to the "wall" clock. In some embodiments, wall time output by the wall clock may determine the real or actual time of an event's occurrence and/or the real or actual time difference between the initiation of a task and the task's completion. In some embodiments, a sample clock may be an alternating signal which may control the rate at which data is passed to a media processing device for processing. For examples, in an embodiment, in a digital audio system, sample clocks may govern the rate at which an analog signal is sampled and the rate at which digital samples are to be passed to a digital-to-analog converter (DAC) controlling the emission of sound by a speaker.

Figure 2:
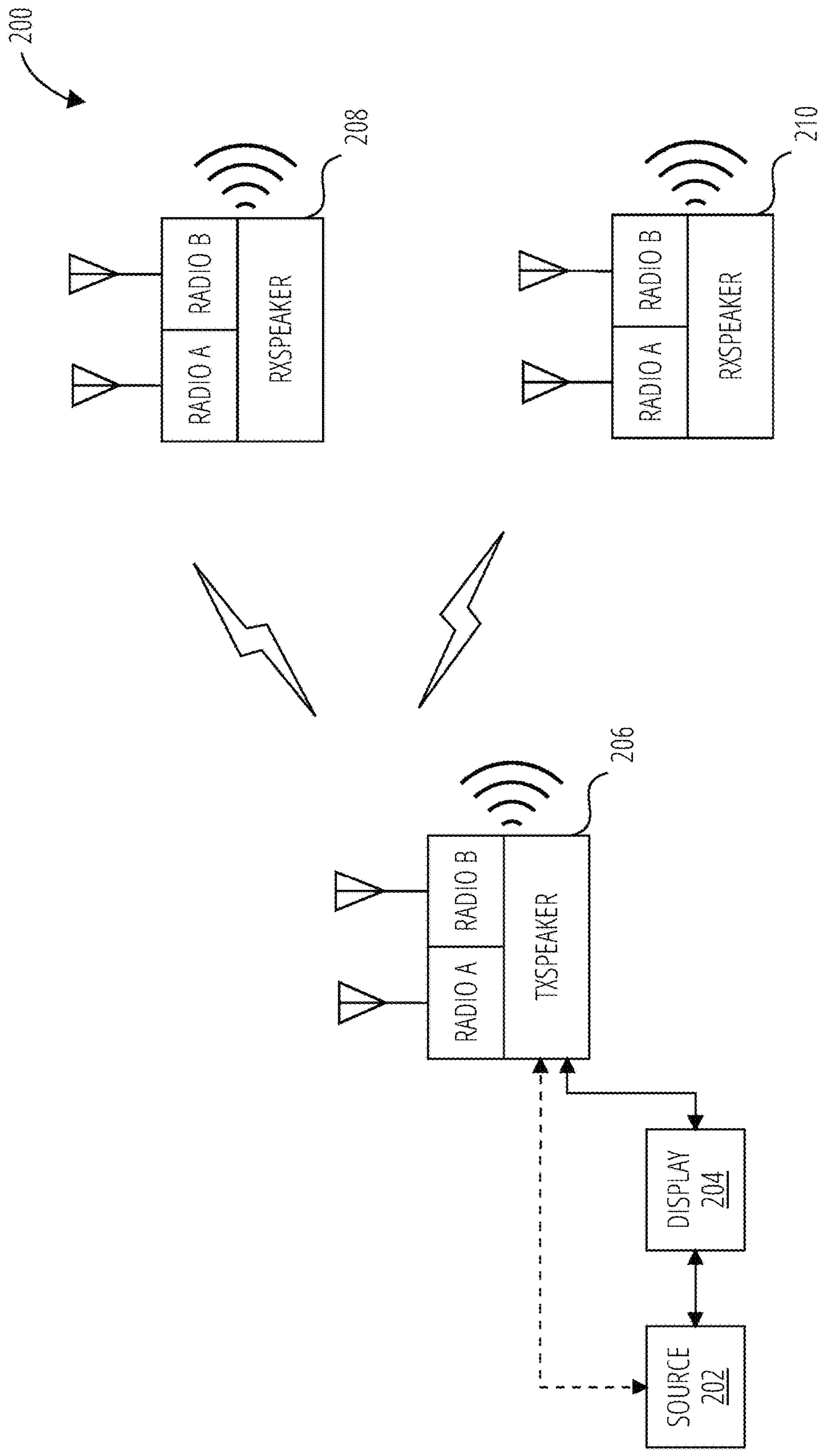
FIG. 2 is a block diagram illustrating components of data transmission network according to some embodiments of the present disclosure.

In general, with reference to FIG. 2, a system 200 in accordance with an embodiment of the present disclosure is shown. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (TxSpeaker) 206, and one or more receiver-speakers (e.g., RxSpeakers 208 and 210). In some embodiments, source 202 may be a source of digital audio and/or video. In some embodiments, source 202 may transmit an audio/video stream including a plurality of packets. In some embodiments, source 202 may be a media player, a gaming console, a mobile device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the TxSpeaker 206. In some embodiments, the media steam may be transmitted from the source 202 to the display 204 and, in turn, the display 204 may transmit audio information corresponding to the media stream to the TxSpeaker 206.

According to some embodiments, TxSpeaker 206 may process the audio information and transmit the processed or transformed audio information to the one or more RxSpeakers (e.g., RxSpeaker 208 and RxSpeaker 210).

According to some embodiments, system 200 may be a multi-radio architecture. In some embodiments, data transmitters and receivers of system 200 may utilize one or more radio chains to communicate. For example, in the non-limiting embodiment of FIG. 2, TxSpeaker 206 and RxSpeakers 208 and 210 have two radio chains Radio A and Radio B. In some embodiments, TxSpeaker 206 and RxSpeakers 208 and 210 may have one or more radio chains.

In an embodiment, TxSpeaker 206 and RxSpeakers 208 and 210 may communicate through independent radio chains. For example, in some embodiments, TxSpeaker 206 may communicate with RxSpeakers 208 and 210 through Radio A, Radio B, or both. It will be noted that, in some embodiments, any radio chain of TxSpeaker 206 and RxSpeakers 208 and 210 may communicate with any other radio chain. For example, in some embodiments, TxSpeaker 206 may use Radio A to communicate with Radio B of RxSpeaker 208 while communicating with Radio A of RxSpeaker 210. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20, 40, 80, 160 MHz bandwidth or other bandwidth or any combination thereof, e.g., in 802.11a/b/g/ac/ax or other wireless communication standard, such as Bluetooth™, Zigbee, Z-Wave, among others or any combination thereof). In some embodiments, Channel A and Channel B may be separated in time (e.g., Temporal Diversity). That is, in some embodiments, data packets may be sent over Channel A and/or Channel B at a different time slots (e.g., alternating time slots) to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a wireless network protocol, such as Wi-Fi, Bluetooth™, Zigbee, Z-Wave, among others or any combination thereof. For example, in some embodiment, a physical layer rate may be 6 Mbps using Binary Phase-Shift Keying (BPSK) or other physical layer rate of a wireless communication specification such as, e.g., 802.11a/b/g/ac/ax. For example, the physical layer rate may include a rate in the range of 1 Mbps to 10 Gbps (e.g., 1 Mbps for DSSS (Direct Sequence Spread Spectrum) in 802.11b up to 10 Gbps for 1024-QAM in 802.11ax, or other specification including but not limited to Bluetooth with GFSK (Gaussian Frequency-shift Keying), Pi/4-DQPSK (Differential Quadrature Phase-Shift Keying), 8-DPSK modulation from 125 kbps to 3 Mbps, etc.). For example, in some embodiment, a coding rate of any two integers, including, e.g., 1/10, 1/9, 1/8, 1/7, 1/6, 5/6, 1/5, 1/4, 3/4, 1/3, 2/3, 1/2, etc., such as 1/2 as disclosed in the 802.11a specification. In some embodiments, a physical layer rate may be 54 Mbps using 64-QAM scheme and a coding rate of 3/4 as disclosed in 802.11a.

According to some embodiments, Channel A and Channel B may have different communication methods (e.g., Broadcast/Multicast versus Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 206, RxSpeaker 208, and RxSpeaker 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

Figure 3:
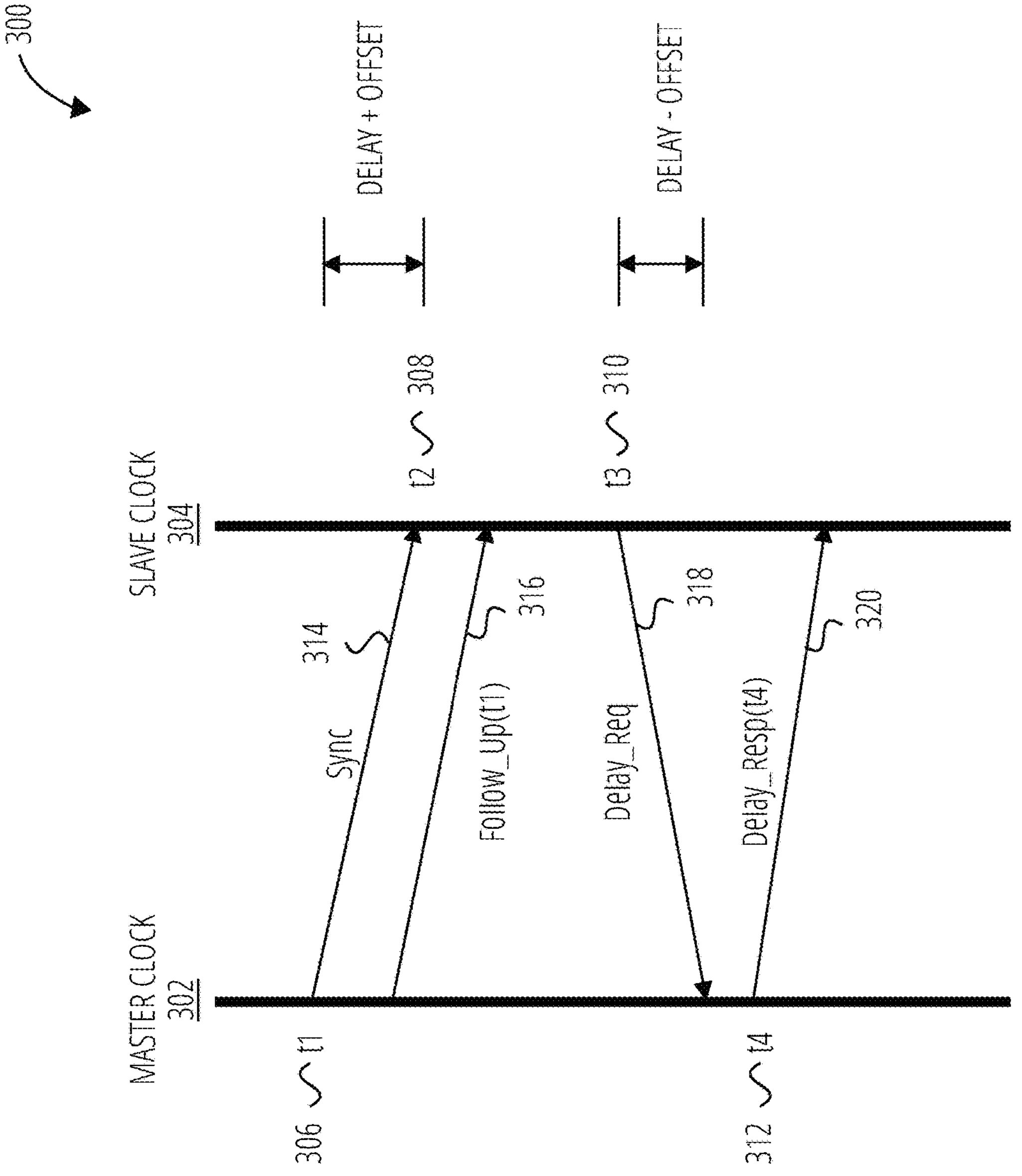
FIG. 3 illustrates a method for synchronizing clocks among devices in a network according to some embodiments of the present disclosure.

Referring now to FIG. 3, FIG. 3 illustrates a method for synchronizing clocks among devices in a network according to some embodiments of the present disclosure. FIG. 3 illustrates a Precision Time Protocol (PTP) of "IEEE Standard for a Precision Clock Synchronization Protocol for Networked Measurement and Control Systems," IEEE Std. 1588-2008 which provides, inter alia, a method 300 of synchronizing a wall time at "secondary" clock 304 distributed among the nodes of a network to a wall time of the network's "primary" clock 302.

According to some embodiments, when operation of a network is initiated, a primary clock 302 may be selected either manually or by a "best primary clock" algorithm. Afterward, messages may be periodically exchanged between a device comprising the primary clock 302 (e.g., the "primary device") and the network devices comprising the secondary clocks 304 (e.g., the "secondary devices") enabling determination of an offset, the time by which a secondary clock leads or lags the primary clock, and the network delay, the time required for data packets to traverse the network.

In some embodiments, at defined intervals (e.g., one, two, three, four second intervals or other interval) the primary device may multicasts a Sync message 314 to the other network devices. In some embodiments, the precise primary clock 302 wall time of the Sync message's transmission, t1 306, is determined and included as a timestamp in either the Sync message 314 or in a Follow-Up message 316. In some embodiments, the secondary device determines the local wall time, t2 308, at which the device received the Sync message 314.

In some embodiments, a Delay_Req message 318 may then be sent by the secondary device to the primary device at time, t3 310. In some embodiments, the primary clock's time of receipt, t4 312, of the Delay_Req message 318 is determined and the primary device responds with a Delay_Resp message 320 which includes a timestamp indicating t4 312. In some embodiments, the secondary device may then determine the network delay and the secondary clock's offset from the four times, t1 306, t2 308, t3 310, and t4 312:

$$\text{Delay}+\text{Offset}=t2-t1 \quad (1)$$

$$\text{Delay}+\text{Offset}=t4-t3 \quad (2)$$

$$\text{Delay}=((t2-t1)+(t4-t3))/2 \quad (3)$$

$$\mathit{Offset}=((t2-t1)-(t4-t3))/2 \quad (4)$$

In some embodiments, consecutive measurements of the offset also permit compensation for the secondary clock's frequency drift. In some embodiments, with the time and frequency drift determined, each secondary clock may be adjusted to match the wall time of the primary clock by adding or subtracting the offset to or from the local wall time and adjusting the secondary clock's frequency.

In some embodiments, a wireless local area network (WLAN) may include media access control (MAC) and physical layer (PHY) specifications for a basic service sets (BSS). The devices which are parts of a BSS may be identified by a service set identification (SSID) which may be assigned or established by the device which starts the network. In some embodiments, each network device or station includes a local timing synchronization function (TSF) timer. In some embodiments, the device's wall clock may be based on a 1 mega-Hertz (MHZ) clock which ticks in microseconds, or other clock or any combination thereof. In some embodiments, during a beacon period, all stations in an independent basic service set (IBSS) may compete to transmit a beacon. In some embodiments, each station may calculate a random delay interval and may set a delay timer scheduling transmission of a beacon when the timer expires. In some embodiments, if a beacon arrives before the delay timer expires, the receiving station may cancel its pending beacon transmission. In some embodiments, the beacon may comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station may set its TSF timer (e.g., the wall clock), to the value of the timestamp thus synchronizing the TSF timers (e.g., the wall clocks) of the transmitting station and the receiving station.

In some embodiments, PTP and TSF may be responsible for synchronizing the wall clocks of all nodes in the respective network to the same wall time but not for synchronizing the sample clocks controlling the processing of the various media transported by the network. In some embodiments, the sample clocks may be recovered from the data stream at each of the network's listeners (e.g., endpoints receiving the data stream) enabling different sample clocks for different media to be transported on the same network.

Figure 4:
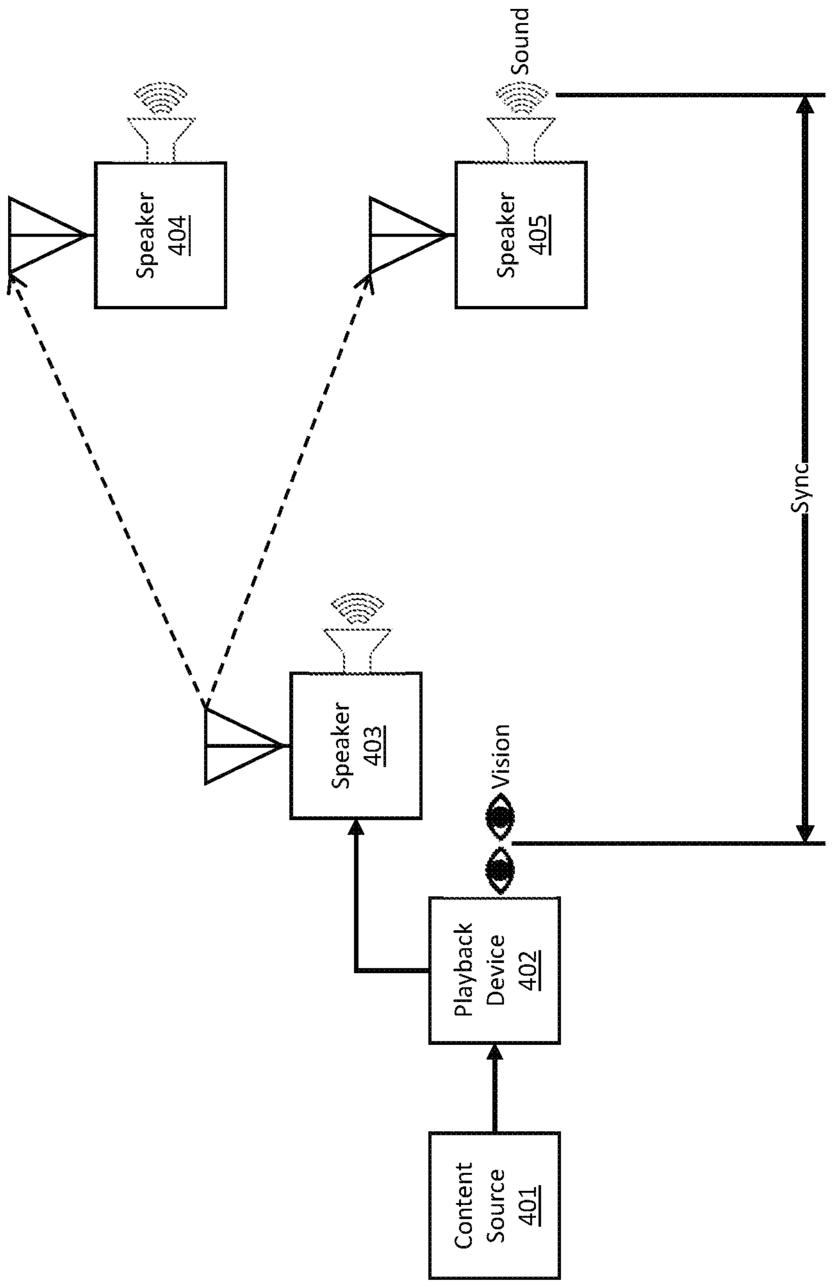
FIG. 4 illustrates a speaker arrangement with synchronization between speakers according to a point of vision and a point of sound according to some embodiments of the present disclosure.

Turning now to FIG. 4, FIG. 4 illustrates a speaker arrangement with synchronization between speakers according to a point of vision and a point of sound according to some embodiments of the present disclosure.

In some embodiments, a content source 401 having audio and visual data may provide content data to a playback device 402, such as a television or any other suitable playback device 402 including, e.g., a smartphone, laptop computer, desktop computer, tablet, portable video device, or any other suitable device for presenting audio and visual data. The playback device 402 may output the visual portion of the data, and may offload audio playback to one or more speakers 403, 404 through 405. Each speaker 403 through 405 may be located a different distance from the point of vision (e.g., the location where the visual portion is presented) at the playback device 402. Thus, each speaker 403 through 405 may be configured to output the audio with a timing that maintains synchronization with the visual portion. Doing so may result in dropping delayed audio packets, e.g., due to network crowding, interrupts, errors, etc. in order to maintain the synchronized timing. Thus, in some embodiments, each speaker 403 through 405 may include a replay buffer to fill in any discontinuities resulting from the dropped audio packets.

Figure 5:
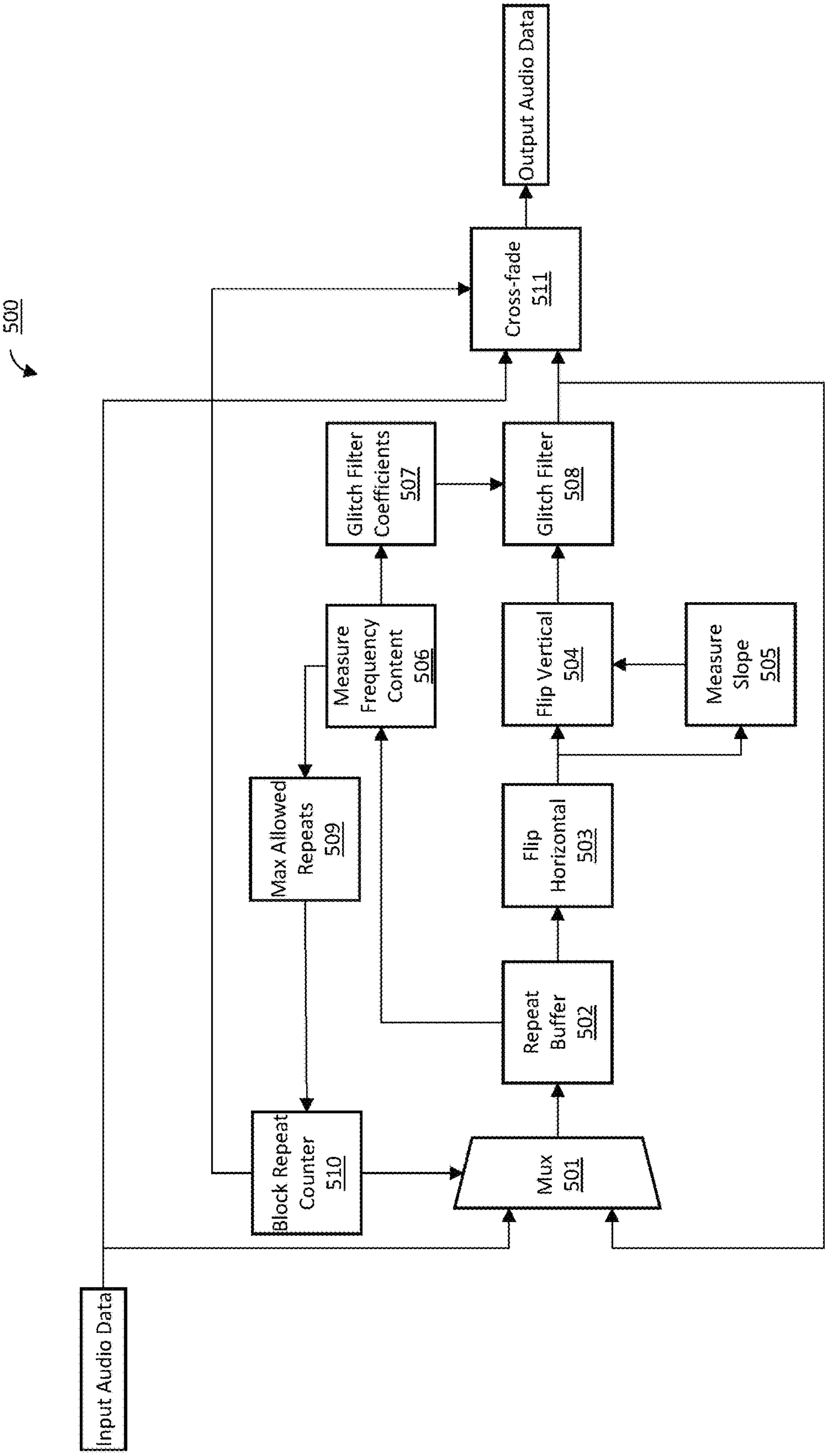
FIG. 5 depicts a functional block diagram of the replay buffer to avoid discontinuities due to delayed audio and other synchronization irregularities according to some embodiments of the present disclosure.

Turning now to FIG. 5, FIG. 5 illustrates a functional block diagram of the replay buffer according to some embodiments of the present disclosure.

In some embodiments, an audio block may be filled by repeating the previous audio block in some way (for example, using a Repeat Buffer 502). For this repeat to be inaudible several factors may be considered. In some embodiments, the audio block may be any length of time in a range of, e.g., 1 to 100 milliseconds (mSec), such as, e.g., 4, 8, 12, 16, or other suitable length or any combination thereof.

a. The audio is to be continuous (no discontinuities).
b. The audio's slope is to be continuous (no discontinuities in the first derivative).
c. The end of the repeated audio block set is to be faded down to crossfade back to the audio after it returns.
d. The audio block is not to be repeated beyond its relevance, and the audio repeat sequence is to be faded to zero. In some embodiments, relevance may be measured according to autocorrelation of the audio. For example, if the audio is autocorrelated within the block then the audio may continue to be similar in the future and the block can be repeated many times. If the autocorrelation within the block is low then future audio can be very different and repeating the audio block may be omitted.

In some embodiments, audio data may be input into a replay buffer 500 of a receiver, e.g., of a speaker 404 and/or 405, to output smooth audio data by resolving discontinuities. In some embodiments, the audio data may include discontinuities due to, e.g., dropped packets or other sources of lost data. To maintain synchronization with across speakers and/or with corresponding images, the discontinuities may advantageously be filled in with simulated audio blocks.

In some embodiments, the audio data may be received by a multiplexer 501. In some embodiments, the multiplexer 501 may include any suitable device that selects between several analog or digital input signals and forwards the selected input to a single output line. The selection is directed by a separate set of digital inputs known as select lines. In some embodiments, the source signals for the multiplexer 501 may include input audio data, repeat audio blocks created by the replay buffer 500, among other sources or any combination thereof.

In some embodiments, the multiplexed audio may be passed to a repeat buffer 502. In some embodiments, the repeat buffer 502 may include any suitable buffer for maintaining a number of previous audio blocks of the audio data.

For example, the repeat buffer 502 may include one or more volatile and/or non-volatile memory devices, including but not limited to: read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In some embodiments, the repeat buffer 502 may temporarily store a predetermined number of audio blocks, such as, e.g., one, two, three, four, five, six, seven, eight, nine, ten or more audio blocks. Accordingly, the repeat buffer 502 may buffer, e.g., as a First-In-First-Out buffer or other buffering method, to enable insertion of a previous audio block previous to a missing audio block to fill a gap in an audio data signal.

Figure 6:
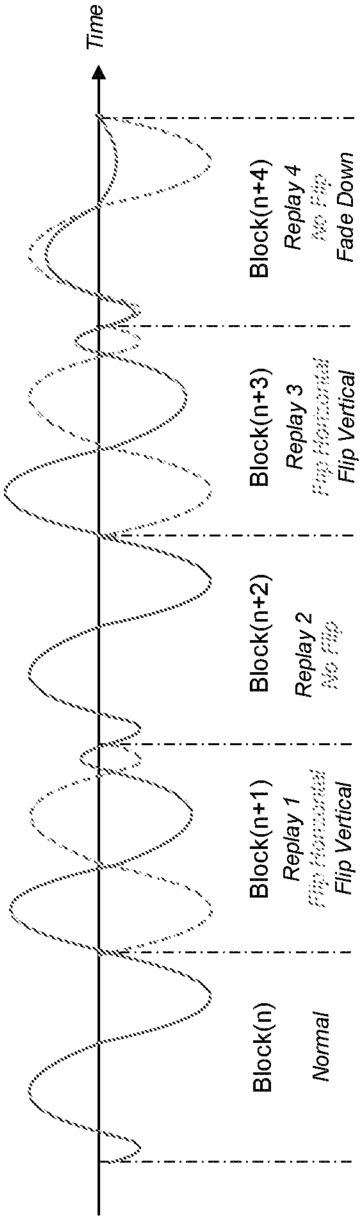
FIG. 6 depicts an example waveform that uses audio block flipping to avoid discontinuities in accordance with one or more embodiments of the present disclosure.

In some embodiments, where a discontinuity is detected, e.g., via a gap between a first time index of a current audio block and a last time index of an immediately preceding audio block, the repeat buffer 502 may output the immediately preceding audio block for insertion into the gap. However, simply re-inserting the immediately preceding audio block may be perceptible by a listener due to, e.g., discontinuities in the audio signal due to the frequency and/or amplitude at the first time index of the immediately preceding audio block not aligning with the frequency and/or amplitude at the last time stamp of the immediately preceding audio block. In order to resolve the discontinuities with a previous audio block in the repeat buffer 502, the previous audio block time index is reversed with the Flip Horizontal block 503 during the repeat, thus flipping the previous audio block to play in reverse. In some embodiments, the Flip Horizontal block 503 may ensure that there are no discontinuities as the last sample of the audio block is replayed first when the time index is reversed, thus ensuring that there is alignment between the frequency and/or amplitude at the first time index of the horizontally flipped immediately preceding audio block and the frequency and/or amplitude at the last time stamp of the original immediately preceding audio block. An even number of flipping returns the same waveform as illustrated in FIG. 6. FIG. 6 depicts an example waveform that uses audio block flipping to avoid discontinuities. The intermediate Flipped Horizontal output is shown in the as dashed line in the figure below. The final output audio is shown as a solid line.

In some embodiments, discontinuities may include misaligned audio slopes at boundaries between audio blocks. In some embodiments, to resolve discontinuities due to the audio slope at the boundaries not being continuous, the audio block can be negated, e.g., as illustrated in FIG. 6, using the Flip Vertical block 504. In some embodiments, the Measure Slope algorithm 505 measures the slope and value at the end of the audio block to enable the flip vertical block 504 to align the flipped audio block. If the slope is negative and the last value is positive or if the slope is positive and the last value is negative then the repeat waveform will be negated.

Figure 7:
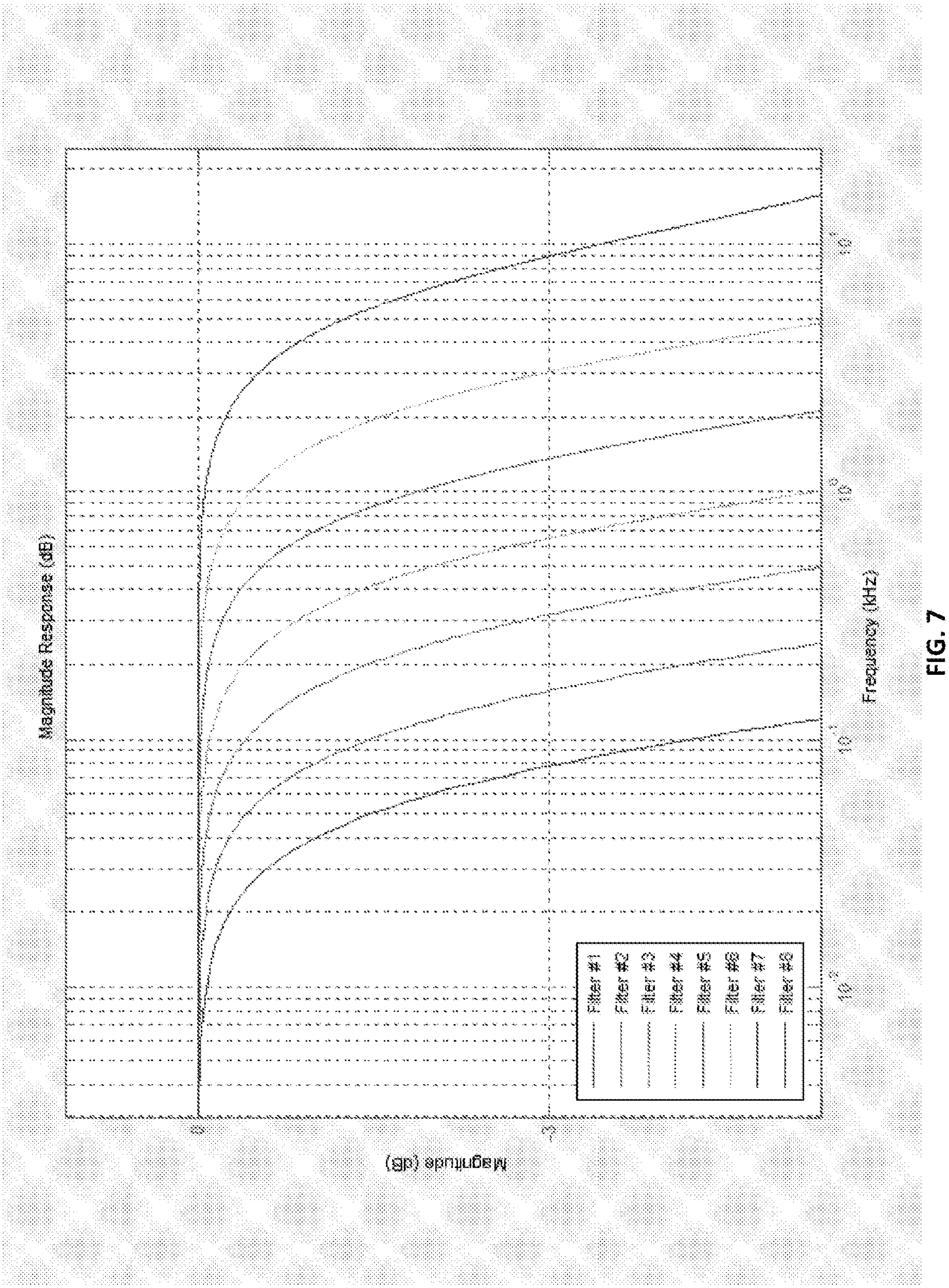
FIG. 7 illustrates a frequency response of filter settings for Glitch Frequency coefficients in accordance with one or more embodiments of the present disclosure.

In some embodiments, flipping the audio block horizontally and/or vertically may lead to glitches. In some embodiments, to remove any glitches from the repeating and flipping processes a Glitch Filter 508 may be applied to the audio. In some embodiments, a bandwidth of the Glitch Filter 508 may be set by the frequency content of the audio block. The higher the frequency content of the audio block the higher the bandwidth setting on the Glitch Filter 508 and the lower frequency content of the audio block the lower the bandwidth setting on the Glitch Filter 508. In some embodiments, the bandwidth may be determined using one or more Glitch Frequency Coefficients 507. In some embodiments, the Glitch Frequency Coefficients 507 implementation may include eight different frequency settings divided on an octave basis, as illustrated in FIG. 7, though any suitable number of frequency coefficients may be employed, such as, e.g., 1, 2, 3, 4, 5, 6, 7, 8, 9, 10, 11, 12 or more. For example, in some embodiments, having determined a majority of the frequency content of the audio to be below some frequency value, a low pass filter can be set to that value to remove other frequency content above the frequency value. As a result, the high frequency glitch content caused by horizontal and vertical flipping may be removed while only removing a small amount audio content.

In some embodiments, at the end of the audio block set the last repeated block may fade down to zero (via the Cross Fade 511). This cases the transition to zero if the audio link has been broken and the audio must go to zero or if the audio will be crossfading back to the normal audio flow. Anytime normal audio returns before the Maximum number of repeats 509 value is reached the crossfade will happen, however if the Maximum number of repeats 509 is reached before the audio returns the output with fade to zero. The maximum number of blocks (Maximum number of repeats 509) that can be repeated (Block Repeat Counter 510) before a fade down is determined by the frequency content of the audio block.

In some embodiments, autocorrelation of an audio block may include a correlation of the audio block with a delayed copy of itself as a function of delay. In some embodiments, the frequency content is a measure of the autocorrelation property of the audio, and is an indication of how long the audio may be sustained before changing. In some embodiments, the frequency content and the maximum number of repeats 509 may be an inverse correlation where the lower the frequency content the longer the repeat buffer is relevant in emulating the audio content, as further detailed below with reference to FIG. 8. In some embodiments, "frequency content" may refer to the magnitude of the Fourier Transform of the signal such that the frequency content is the amplitude of the frequencies that make up the signal. In some embodiments, the Fourier Transform of the autocorrelation of the signal is the magnitude squared of the frequency content, where the signal frequency content and signal autocorrelation are mathematically related.

Therefore, in some embodiments, the higher the frequency content of the audio block the lower the number of repeats allowed and the lower frequency content of the audio block the higher the number of repeats allowed. In some embodiments, the Measure Frequency Content block 506 may provide for eight different Maximum number of repeats 509 settings divided on an octave basis.

Figure 8:
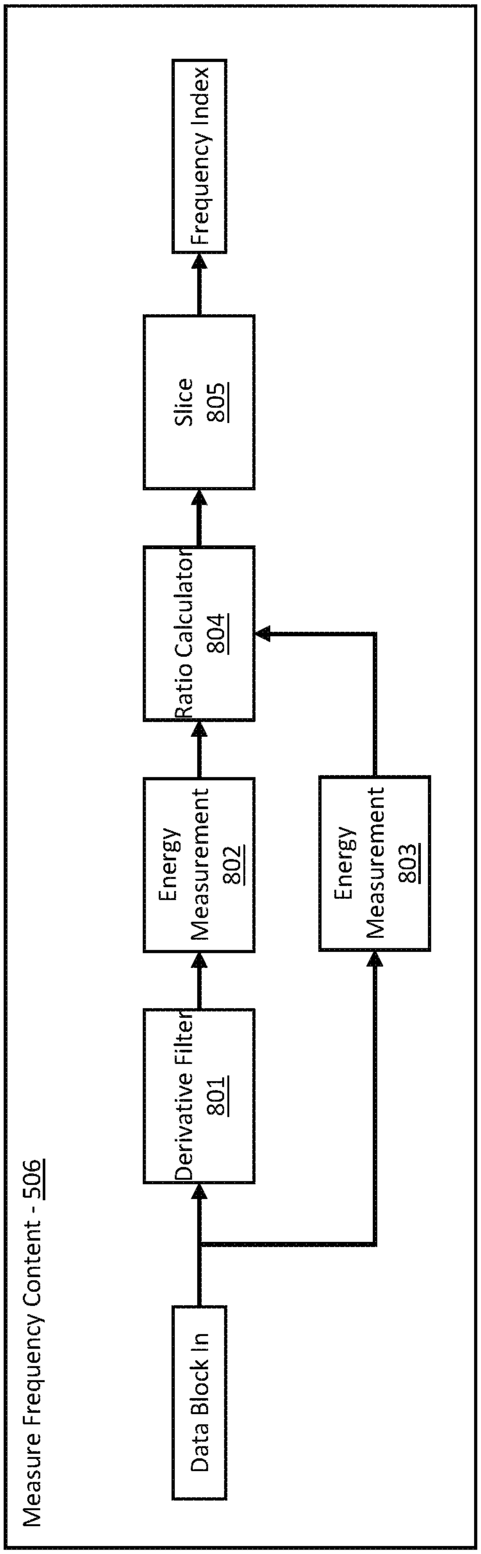
FIG. 8 depicts a Measure Frequency Content block diagram in accordance with one or more embodiments of the present disclosure.

Turning now to FIG. 8, FIG. 8 illustrates a Measure Frequency Content block diagram according to some embodiments of the present disclosure.

Figure 9:
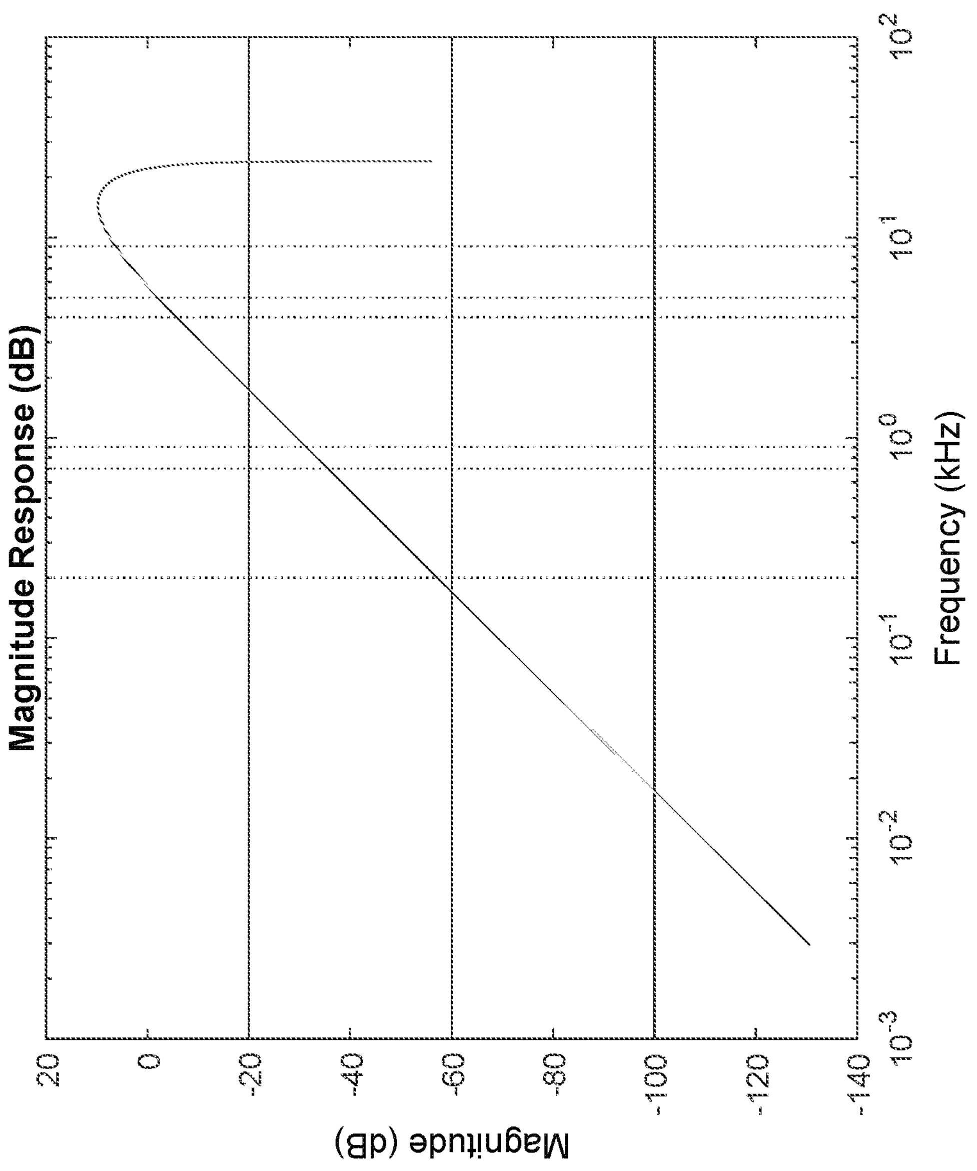
FIG. 9 depicts a bandlimited Derivative Filter using the Measure Frequency Content block of FIG. 5 in accordance with one or more embodiments of the present disclosure.

In some embodiments, the Measure Frequency Content block 506 may determine an eight value Frequency Index by measuring the energy of the Repeat Block and the energy of the Repeat Block when filtered with the Derivative Filter 801. The bandlimited Derivative Filter, $h(n)=[-1, 1, 1, -1]$, has a response similar to the derivative function. This response increases with frequency until about 15 kHz and then decreases with frequency as illustrated in FIG. 9. FIG. 9 illustrates a bandlimited Derivative Filter using the Measure Frequency Content block of FIG. 5 according to some embodiments of the present disclosure.

In some embodiments, an energy measurement block 802 may measure the energy on the filtered signal. A parallel energy measurement block 803 may measure the energy on the unfiltered signal. A ratio calculator function 804 may determine a ratio of the two signals generated and then a slice block 805 may slice the resulting signal into eight indexes. These slices are then calibrated for the following frequency ranges using a stepped frequency tone to output one or more frequency indices:

Index Frequency Range a. Less than 78 Hz
b. 78 to 156 Hz
c. 156 to 312 Hz
d. 312 to 624 Hz
e. 624 to 1248 Hz
f. 1248 to 2496 Hz
g. 2496 to 4992 Hz
h. Greater than 4992 Hz In some embodiments, the energy measurement can be done using the sum of absolute values (as in the current embodiment) or the sum of squared values, implemented to fit the capabilities of the processor used. Similarly, the derivative function could be implemented with any filter function in which the amplitude is a strong function of frequency.

In some embodiments, the ratio calculator function 804 normalizes the Frequency Content Measurement to variation in the input power level so that the output index is a function of the average frequency content only.

Figure 10:
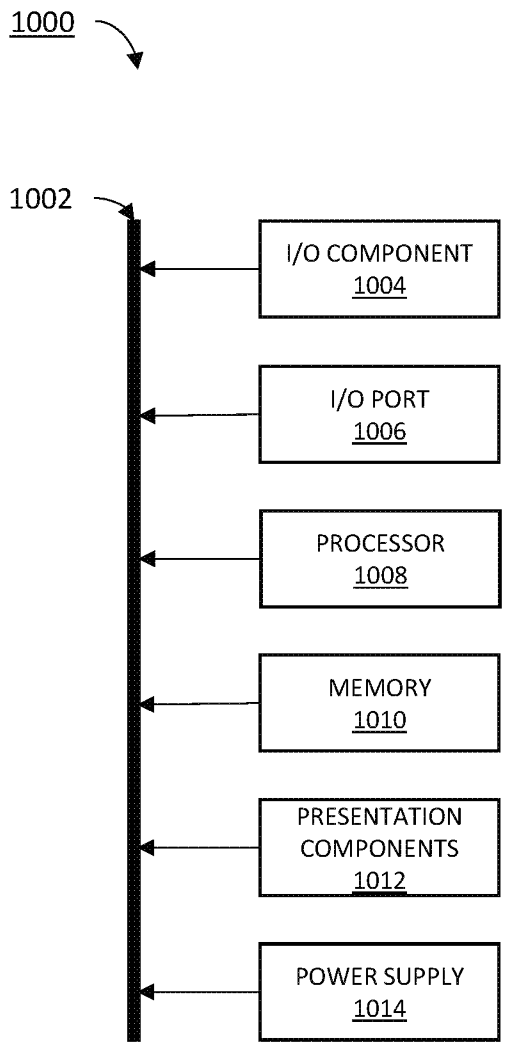
FIG. 10 is a schematic diagram illustrating an example embodiment of a device according to some embodiments of the present disclosure.

Turning now to FIG. 10, FIG. 10 is a schematic diagram illustrating an example embodiment of a device 1000 (e.g., a client device, a computing device) that may be used within the present disclosure. In some embodiments, device 1000 may be a source 202, a display 204, a TxSpeaker 206, a RxSpeaker 208, a RxSpeaker 210, or a combination thereof as described with respect to FIG. 2. The device 1000 is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices 1000 in any number of different ways to implement a single embodiment of the present disclosure. Accordingly, embodiments of the present disclosure are not limited to a single device 1000, as would be appreciated by one with skill in the art, nor are they limited to a single type of implementation or configuration of the example device 1000.

In some embodiments, device 1000 may include a bus 1002 that can be coupled to one or more of the following illustrative components, directly or indirectly: input/output (I/O) component 1004, I/O port 1006, one or more processors 1008, one or more memories 1010, one or more presentation components 1012, and power supply 1014. One of skill in the art will appreciate that the bus 1002 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device 1000 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 1000.

In some embodiments, memory 1010 can include computer-storage media in the form of volatile and/or nonvolatile memory. In some embodiments, memory 1010 may be removable, non-removable, or any combination thereof. For example, in some embodiments, memory 1010 may be a hardware device such as hard drives, solid-state memory, optical-disc drives, and the like.

In some embodiments, device 1000 can include one or more processors that read data from components such as the memory 1010, the various I/O components 1004, etc. In some embodiments, presentation components 1012 present data indications to a user or other device. For example, in some embodiments, presentation components 1012 may include a display device, speaker, a printing component, a haptic component, etc.

In some embodiments, the I/O ports 1006 can enable the device 1000 to be logically coupled to other devices, such as I/O components 1004. In some embodiments, some of the I/O components 1004 can be built into the device 1000. In some embodiments, I/O component 1004 may be a microphone, joystick, recording device, game pad, satellite dish, scanner, printer, wireless device, networking device, and the like. In some embodiments, I/O port 1006 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An audio device for wireless audio playback, comprising:

a wireless receiver configured to receive a sequence of audio blocks from a source device;

a replay buffer configured to:

store the sequence of audio blocks;

detect a discontinuity in the sequence of audio blocks;

retrieve a stored audio block preceding the discontinuity;

generate a replacement audio block from the stored block by applying at least one of (i) a horizontal flip of time indices of the stored audio block, or (ii) a vertical flip of the replacement audio block based on a slope continuity determination at a boundary between the stored audio block and the replacement audio block;

filter the replacement audio block using a glitch filter having frequency coefficients selected based on frequency content determined for the stored audio block; and crossfade the replacement audio block with the stored audio block adjacent the discontinuity to produce output audio that conceals the discontinuity; and an output stage configured to drive a loudspeaker with the output audio.

2. The audio device of claim 1, wherein the wireless receiver is implemented using at least one of a Wi-Fi transceiver or a Bluetooth transceiver.

3. The audio device of claim 1, wherein the replay buffer is configured to store at least two prior audio blocks.

4. The audio device of claim 1, wherein the replay buffer is configured to select filter coefficients from a plurality of octave-based frequency bands.

5. The audio device of claim 1, wherein the crossfade is performed with a fade-to-zero if a maximum number of replacement audio blocks is generated without return of normal audio blocks.

6. The audio device of claim 1, further comprising a clock configured to synchronize playback timing with at least one other audio device based on a master clock.

7. The audio device of claim 1, wherein the output stage comprises an amplifier and a loudspeaker integrated within a wireless speaker housing.

8. The audio device of claim 1, wherein the audio device is integrated into a television, a soundbar, a gaming console, or an earbud.

9. The audio device of claim 1, wherein the replay buffer is further configured to measure slope continuity at the boundary between the stored audio block and the replacement audio block to determine whether vertical flipping of the replacement audio block is required.

10. A method for concealing dropped audio blocks, comprising:

receiving, at an audio device, a sequence of audio blocks over a wireless network;

buffering the audio blocks in a replay buffer;

retrieving a previous audio block upon detecting a missing audio block;

generating a replacement audio block from the previous audio block by reversing a time order of the previous audio block and conditionally inverting the slope of the reversed block based on a slope continuity determination at a boundary between the previous audio block and the replacement audio block;

applying a glitch filter to the replacement audio block, wherein filter coefficients are selected according to measured frequency content of the previous audio block; and crossfading the replacement audio block with the previous audio block adjacent the missing audio block to maintain audio continuity during playback.

11. The method of claim 10, wherein the audio device is a wireless speaker.

12. The method of claim 10, wherein detecting the missing audio block comprises identifying a gap in sequential packet identifiers.

13. The method of claim 10, wherein the glitch filter bandwidth is increased for audio blocks having higher frequency content.

14. The method of claim 10, further comprising synchronizing playback of the replacement audio block with visual media output by a display device.

15. The method of claim 10, wherein the crossfading comprises fading the replacement audio block to zero when a maximum allowed number of replacements is reached without return of normal audio data.

16. An audio device, comprising:

a processor configured to execute a set of instructions;

a memory configured to store the set of instructions wherein when executed by the processor of the audio device to:

receive a sequence of audio blocks over a wireless network;

buffer the audio blocks in a replay buffer;

retrieve a previous audio block in response to detecting a missing audio block;

generate a replacement audio block from the previous audio block by reversing a time order of the previous audio block and conditionally inverting the slope of the reversed block based on a slope continuity determination at a boundary between the previous audio block and the replacement audio block;

apply a glitch filter to the replacement audio block, wherein filter coefficients are selected according to measured frequency content of the previous audio block; and crossfade the replacement audio block with the previous audio block adjacent the missing audio block to maintain audio continuity during playback.

17. The audio device of claim 16, wherein the set of instructions are executable to configure a wireless transceiver to communicate over at least one of Wi-Fi, Bluetooth, Zigbee, Z-Wave, or an Audio Video Bridging (AVB) network.

18. The audio device of claim 16, wherein the set of instructions are further executed to synchronize playback timing with at least one other receiving device based on a master clock.

19. The audio device of claim 16, wherein the set of instructions are further executed to determine slope continuity at a boundary between the previous audio block and the replacement audio block and select whether to vertically flip the replacement audio block based on the slope continuity.

20. The audio device of claim 16, wherein the set of instructions are further executed to fade replacement audio blocks to zero when a threshold number of replacement blocks has been output without return of normal audio.

* * * * *